United States Patent Office 2,998,452
Patented Aug. 29, 1961

2,998,452
SURFACE-ACTIVE BASIC POLYETHERS
Herman A. Bruson, North Haven, and Thomas P. O'Day, Hamden, Conn., assignors to Olin Mathieson Chemical Corporation
No Drawing. Filed Mar. 7, 1958, Ser. No. 719,715
7 Claims. (Cl. 260—570.9)

This invention relates to novel water-soluble, basic nitrogenous ethers possessing powerful emulsifying and detergent properties.

An object of this invention is to provide new water-soluble substances useful as detergents, which serve as excellent heavy-duty household detergents, without requiring the addition of alkaline builders such as trisodium phosphate or sodium silicate.

Another object of this invention is to provide new basic nitrogenous ethers which can be mixed with the commonly available "non-ionic" soaps to produce liquid detergents of improved potency, which do not separate or become cloudy or hazy and which are non-corrosive to tin-plated steel.

A further object of this invention is to provide novel surface-active monomeric compounds, containing basic nitrogen and ether-containing side chains, which are readily soluble in water to yield mildly alkaline solutions, characterized by low surface tension and excellent corrosion-inhibiting properties.

According to this invention, the above objects are attained by reacting ethylene oxide with a monomeric non-resinous derivative of a monohydric alkyl phenol having the formula

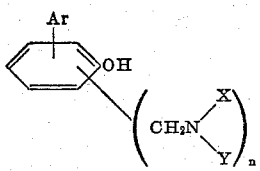

wherein "A" is an alkyl group containing up to 20 carbon atoms, with all said constituents containing at least 4 carbon atoms; each of "X" and "Y" is a hydroxyalkyl radical containing 2 to 20 carbon atoms; and "r" and "n" are integers less than 3.

Particularly valuable water-soluble nitrogenous ethers are obtained by reacting from about 8 to 50 moles of ethylene oxide with one molecular equivalent of a starting reagent as defined above. The reaction can be carried out at ordinary atmospheric pressure or at higher pressures in a suitable vessel, preferably under a blanket of nitrogen. The reaction occurs readily at temperatures between about 90° C. and 150° C., and no catalyst is required. The products are amber to reddish viscous liquids, free from objectionable odor, and are useable directly as powerful detergents.

In the starting materials as above defined, the alkyl group or groups "A" can be any convenient and suitable primary, secondary or tertiary alkyl group, straight or branched chain in character. Monomeric phenolic amines having as para-nuclear substituent a tertiary octyl, iso-nonyl, iso-dodecyl or iso-octadecyl group are the preferred starting materials. Preferably "X" and "Y" are the same hydroxyalkyl group, containing 2 to 20 carbon atoms, and most advantageously consist of the 2-hydroxyethyl or 2-hydroxypropyl groups. When "X" is 2-ethylhexyl, dodecyl, octadecyl, cyclohexyl, fenchyl or isobornyl, "Y" is advantageously 2-hydroxyethyl. When "X" is hydrogen or a lower alkyl group such as methyl, ethyl, butyl or amyl, "Y" is advantageously 2-hydroxypropyl, hydroxybutyl or hydroxyoctyl.

When monomeric starting materials as above defined are reacted with about 8 to 50 moles of ethylene oxide per mole, the products are excellent surface-active compounds which dissolve readily in water to yield mildly alkaline solutions having a pH at 25° C. generally within the range of 7.5 to 10 and displaying low surface tension. Reaction with smaller proportions of ethylene oxide or substitution of higher epoxides such as propylene oxide for the ethylene oxide results in products of inadequate solubility in aqueous solutions. Departures from the limitations defined above for the substituent groups results in products not displaying the desired combination of properties, particularly with respect to surface-activity.

The products in accordance with this invention thus consist of monomeric reaction products characterized as a derivative of the above-defined structure containing a polyether substituent through the addition of at least eight moles of ethylene oxide per mole of starting material. This addition may occur mainly on the phenolic or other hydroxyl group of the starting reagent or it may occur on both. In any event, the product has a composition in accordance with the formula

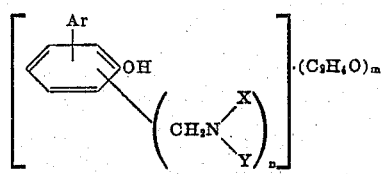

wherein $m$ is a number within the range of about 8 to 50 and the other symbols are as defined above.

The starting reagents are readily prepared from commercially available materials in accordance with the procedures taught in Bruson patents U.S. 2,033,092 and 2,114,122 for the obtainment of monomeric non-resinous products. It should be noted in this connection that derivatives described in the above patents, other than those containing hydroxyalkyl groups linked to nitrogen, undergo decomposition with formation of volatile substituted amines when reacted with ethylene oxide. This behavior is in marked contrast to the substantially quantitative addition of ethylene oxide in accordance with the present invention.

Illustrative embodiments of this invention are shown in the following specific examples, in which essentially the same procedure was used in the syntheses, as follows:

The starting phenolic amine, usually 0.1 mole in amount, was placed in a flask fitted with a stirrer, a reflux condenser cooled to −80° C. and an inlet tube for providing a stream of nitrogen. The desired amount of ethylene oxide was slowly bubbled into the liquid, kept at about 120°–130° C., during the course of about 2 hours while the liquid was stirred and an atmosphere of nitrogen was maintained. At the end of this time, the flask contained an amber- to reddish-colored liquid, which was maintained at 120°–130° C. under nitrogen for up to another hour. The liquid was then subjected while warm to a vacuum of about 18 mm. mercury in order to remove any uncombined ethylene oxide. The reaction was substantially quantitative in each case, resulting in amber to reddish viscous liquid products characterized by ready solubility in tap water to yield mildly alkaline soap-like solutions having low surface tension which foamed readily and displayed marked emulsifying powers.

For convenience, the specific examples are presented in tabular form, the column headings representing the symbols as defined above.

| Example | A | X | Y | n | m |
|---|---|---|---|---|---|
| 1 | —C$_4$H$_9$ | —CH$_2$CH$_2$OH | —CH$_2$CH$_2$OH | 2 | 8 |
| 2 | —C$_7$H$_{15}$(iso) | —CH$_2$CH$_2$OH | —CH$_2$CH$_2$OH | 2 | 10 |
| 3 | —C$_8$H$_{17}$(iso) | —CH$_2$CH$_2$OH | —CH$_2$CH$_2$OH | 2 | 10 |
| 4 | —C$_9$H$_{19}$(iso) | —CH$_2$CH$_2$OH | —CH$_2$CH$_2$OH | 2 | 8 |
| 5 | —C$_9$H$_{19}$(iso) | —CH$_2$CH$_2$OH | —CH$_2$CH$_2$OH | 2 | 10 |
| 6 | —C$_9$H$_{19}$(iso) | —CH$_2$CH$_2$OH | —CH$_2$CH$_2$OH | 2 | 12 |
| 7 | —C$_9$H$_{19}$(iso) | —CH$_2$CH$_2$OH | —CH$_2$CH$_2$OH | 2 | 14 |
| 8 | —C$_9$H$_{19}$(iso) | —CH$_2$CH$_2$OH | —CH$_2$CH$_2$OH | 2 | 16 |
| 9 | —C$_9$H$_{19}$(iso) | —CH$_2$CH$_2$OH | —CH$_2$CH$_2$OH | 2 | 18 |
| 10 | —C$_9$H$_{19}$(iso) | —CH$_2$CH$_2$OH | —CH$_2$CH$_2$OH | 2 | 20 |
| 11 | —C$_9$H$_{19}$(iso) | —CH$_2$CH$_2$OH | —CH$_2$CH$_2$OH | 2 | 30 |
| 12 | —C$_{12}$H$_{25}$(iso) | —CH$_2$CH$_2$OH | —CH$_2$CH$_2$OH | 2 | 10 |
| 13 | —C$_7$H$_{15}$ | —CH$_2$CH$_2$OH | —CH$_2$CH$_2$OH | 1 | 10 |
| 14 | —C$_8$H$_{17}$ | —CH$_2$CH$_2$OH | —CH$_2$CH$_2$OH | 1 | 10 |
| 15 | —C$_9$H$_{19}$ | —CH$_2$CH$_2$OH | —CH$_2$CH$_2$OH | 1 | 10 |
| 16 | —C$_{12}$H$_{25}$ | —CH$_2$CH$_2$OH | —CH$_2$CH$_2$OH | 1 | 10 |
| 17 | —C$_7$H$_{15}$ | H | —CH$_2$CH$_2$OH | 1 | 10 |
| 18 | —C$_8$H$_{17}$ | H | —CH$_2$CH$_2$OH | 1 | 10 |
| 19 | —C$_9$H$_{19}$ | H | —CH$_2$CH$_2$OH | 1 | 10 |
| 20 | —C$_8$H$_{17}$(tertiary) | —C$_8$H$_{17}$ | —CH$_2$CHOH.CH$_3$ | 1 | 20 |
| 21 | —C$_{18}$H$_{37}$(iso) | —cyclohexyl | —CH$_2$CH$_2$OH | 1 | 35 |
| 22 | —C$_8$H$_{17}$(tertiary) | —CH$_2$CHOH.CH$_3$ | —CH$_2$CHOH.CH$_3$ | 1 | 25 |
| 23 | —CH$_3$(ortho) and —C$_8$H$_{17}$(para) | —CH$_2$CHOH.CH$_3$ | —CH$_2$CHOH.CH$_3$ | 1 | 30 |
| 24 | —C(CH$_3$)$_3$(ortho) and —C$_9$H$_{19}$(para) | —CH$_2$CH$_2$OH | —CH$_2$CH$_2$OH | 1 | 18 |

In each example, the yield of product amounted substantially to the total reagents used, thus confirming the composition as above described. However, additional confirmation was obtained through representative analyses.

Thus the product of Example 5, having 10 moles of added ethylene oxide per mole of phenolic amine, was found to have hydroxyl number of 311 to 325 and neutral equivalent of 452 to 453 as compared with theoretical values of 314 and 447, respectively.

In this, as well as in other series prepared from a given starting reagent, the use of less than 8 moles of ethylene oxide, for example 6, per mole resulted in a product insoluble in water.

As the proportion of reacted ethylene oxide is increased, the product reddens somewhat in color and continues to display water solubility and excellent surface-activity. Some decrease in foaming tendency appears to occur, which may be desired for certain uses. However, the addition of more than 50 moles of ethylene oxide per mole offers in most cases insufficient improvement in desired properties to make the additional time of reaction and need for more reagent advisable.

Measurements of surface tension and interfacial tension were carried out on representative samples, as described in "Detergency Evaluation and Testing" by J. C. Harris (Interscience, N.Y., 1954), pp. 27–33. Typical measurements of solutions of products of this invention in distilled water are summarized in the following table.

| Example | Surface Tension (Dynes per cm.) Concentration | | Interfacial Tension (Dynes per cm.) (against "Nujol" Mineral Oil) Concentration | |
|---|---|---|---|---|
| | 1% | 0.1% | 1% | 0.1% |
| 1 | 31.0 | | 2.9 | |
| 2 | 30.3 | | 1.5 | |
| 3 | 30.5 | 30.2 | 1.5 | 1.1 |
| 4 | 30.1 | | 0.6 | |
| 12 | 29.2 | | 0.3 | |
| 13 | 28.9 | | 0.5 | |
| 14 | 28.4 | 30.4 | 0.–0.1 | 0.2 |
| 15 | 28.4 | | 0.3 | |
| 16 | 28.2 | | 0.2 | |
| 17 | 28.4 | | 0.–0.3 | |
| 18 | 28.6 | 29.3 | 0.–0.1 | 0.–0.2 |
| 19 | 28.2 | | 0.–0.1 | |

In contrast to the above excellent values, a derivative similar to Examples 1 to 4 containing 10 moles of added ethylene oxide per mole, but containing a nuclear methyl substituent displayed a surface tension of 43.8 dynes per cm. at 1% concentration and 46.1 at 0.1%, while the interfacial tension was measured as 8.1 and 9.6 dynes per cm. at the above concentrations, respectively.

Inhibition of metal corrosion effected by the compounds of this invention is illustrated in the data of the following table showing the loss in weight of samples of steel and copper after immersion in a control solution containing 1% HCl for a week at room temperatures, as contrasted with the weight loss in the same solution containing also 0.5% by weight of the indicated compound.

| Solution | Weight Loss— Steel Plate | Weight Loss— Copper Wire |
|---|---|---|
| | Percent | Percent |
| 1% HCl—Control | 0.58 | 24 |
| 1% HCl+cmpd. Ex. 5 | 0.21 | 1 |
| 1% HCl+cmpd. Ex. 8 | 0.20 | 1.5 |
| 1% HCl+cmpd. Ex. 10 | 0.23 | 0.75 |
| 1% HCl+cmpd. Ex. 11 | 0.24 | 0.75 |

Thus, the compounds of this invention are advantageous addition agents to pickling and other acid solutions for treating metals, and accomplish a significant decrease in undesired corrosion.

In another test of corrosion inhibition, steel and copper strips in contact were partly immersed in a 50% by volume solution of ethylene glycol in tap water as control, and in the same solution containing 0.5% by weight of a compound of this invention. The samples were heated to boiling under reflux for 8 hours a day for 16 consecutive days and allowed to cool between the periods of boiling. At the end of the test period, the control sample exhibited extensive rusting of the steel and the solution was highly colored and turbid, while in the inhibited samples, the metals appeared unaffected and the solution was clear.

Analyses were made of the iron content of the solutions and showed the presence of the following weights of iron in the solutions after identical exposure and treatment.

| | Inhibited Solution, mg. | Control Solution, mg. |
|---|---|---|
| Weight of Iron | 8.8 | 29.2 |

Based on the excellent combination of surface-active properties and the mild alkalinity of solutions of the novel compounds of this invention, they are well adapted for uses requiring effective detergents. For example, they constitute powerful detergents for household use without any requirement for the addition of inorganic alkaline "builders" such as alkali metal phosphates or silicates in accordance with the usual practice.

For some heavy duty detergent uses, the compounds of this invention may advantageously be mixed with about an equal weight of a non-ionic surface-active agent of the type Alkyl—C$_6$H$_4$—(OCH$_2$CH$_2$)$_x$OH wherein the alkyl group contains 8 to 12 carbon atoms and $x$ is a number from 6 to 30.

Because of the metal-protective action of the novel basic nitrogenous ethers of this invention, such solutions with or without the admixture of water can be packaged and stored in tin cans without rusting.

For most applications, the amber to reddish color of these compounds is not detrimental, particularly as in most cases they are used in rather dilute solutions. However, it has been found that they are readily bleached by the use of a small proportion of hydrogen peroxide to light straw-colored liquids.

We claim:

1. A water-soluble surface-active agent having the formula

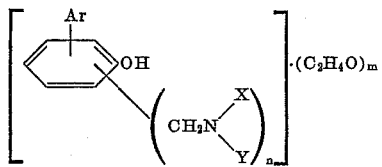

wherein A is an alkyl group containing up to 20 carbon atoms, all of said alkyl groups containing a total of at least 4 carbon atoms; each of X and Y is a hydroxyalkyl radical containing 2 to 20 carbon atoms; $r$ and $n$ are integers from 1 to 2; and $m$ is a number between about 8 and 50.

2. A water-soluble surface-active agent having the formula

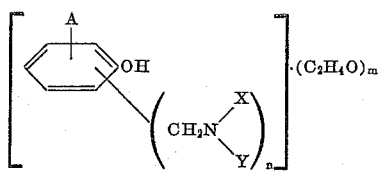

wherein A is an alkyl group containing 4 to 20 carbon atoms each of X and Y is a hydroxyalkyl radical containing 2 to 20 carbon atoms, $n$ is an integer from 1 to 2 and $m$ is a number between about 8 and 50.

3. A surface-active agent according to claim 2, wherein $n$ is one.

4. A surface-active agent according to claim 2, wherein $n$ is two and each of X and Y is a hydroxyethyl group.

5. A surface-active agent according to claim 2, wherein $n$ is one and each of X and Y is a hydroxyethyl group.

6. A surface-active agent according to claim 1, wherein $r$ is two, $n$ is one and each of X and Y is a hydroxyethyl group.

7. A surface-active agent according to claim 2, wherein A is a nonyl group, $n$ is two, and each of X and Y is a hydroxyethyl group.

References Cited in the file of this patent

UNITED STATES PATENTS

| | | |
|---|---|---|
| 2,033,092 | Bruson | Mar. 3, 1936 |
| 2,604,399 | Donovan et al. | July 22, 1952 |
| 2,792,359 | De Groote | May 14, 1957 |
| 2,832,795 | Hampel et al. | Apr. 29, 1958 |
| 2,876,263 | Mark | Mar. 3, 1959 |